Aug. 22, 1933.  G. K. PARSONS  1,923,879
TRANSMISSION
Filed Feb. 23, 1932  3 Sheets-Sheet 1

INVENTOR
BY George K. Parsons
Swan, Frye & Hasdety
ATTORNEY

Aug. 22, 1933.                G. K. PARSONS                1,923,879
                               TRANSMISSION
                           Filed Feb. 23, 1932         3 Sheets-Sheet 2

INVENTOR
BY George K. Parsons
Swan, Frye & Hardesty
ATTORNEY

Aug. 22, 1933.    G. K. PARSONS    1,923,879
TRANSMISSION
Filed Feb. 23, 1932    3 Sheets-Sheet 3
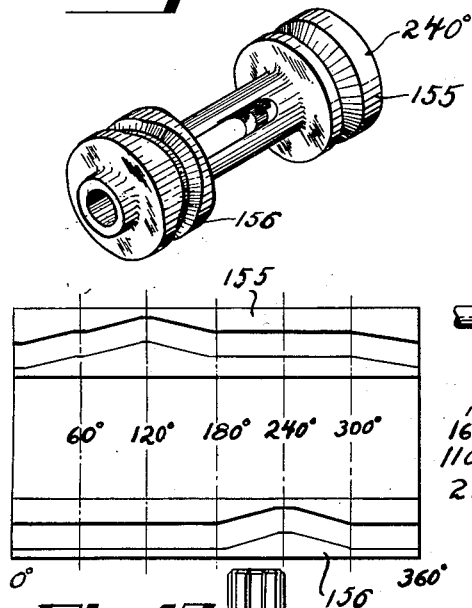
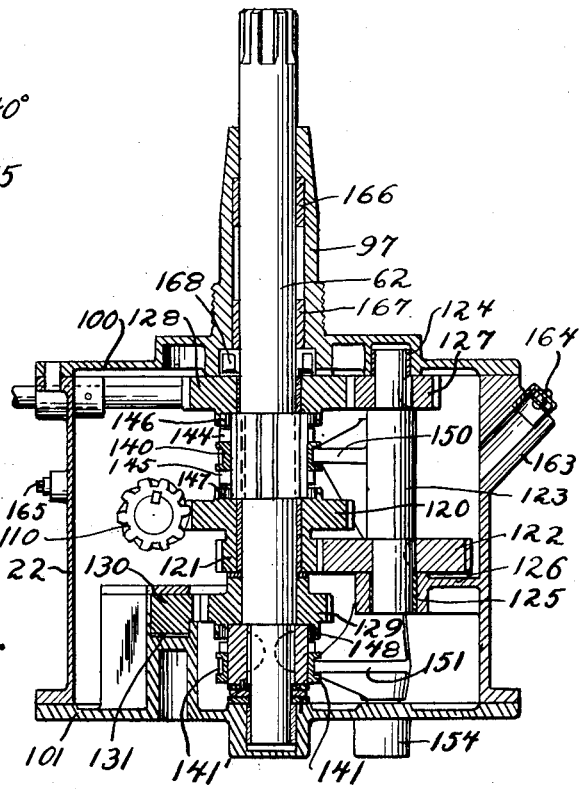
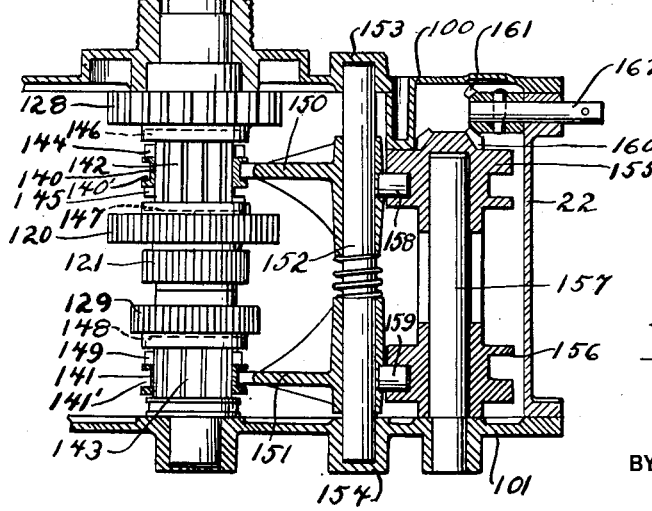
INVENTOR
George K. Parsons
BY Swan, Frye & Hardesty
ATTORNEY Patented Aug. 22, 1933

1,923,879

UNITED STATES PATENT OFFICE 1,923,879

TRANSMISSION

George K. Parsons, Detroit, Mich.

Application February 23, 1932
Serial No. 594,681

3 Claims. (Cl. 74—14)

This invention relates to power transmission mechanisms and more particularly to an improved change-speed gearing construction and arrangement, especially suitable for use in a convertible washing machine of the type described in my copending application, Serial Number 530,-117, filed April 14, 1931; or such as is disclosed in my other copending application Serial Number 594,679, filed February 23, 1932. My improved transmission and the principles thereof will be seen to be utilizable however in conjunction with other machinery and in other situations where the transmission and control power are involved. An important object of the invention is the provision of a transmission which will be very compact in size, yet sturdy, efficient, practically noiseless in operation, and by means of which, while the same is being driven by a constant speed power source, a driven shaft may be rotated at selectively variant speeds, or may be oscillated, at the will of the operator.

My improved transmission has for a further object the incorporation of shifting means by which the effective gearing ratios and the method of driving the driven shaft may be varied to accomplish the above outlined results by simple swinging movement of a single lever about its pivot, and in which, by such lever movement, smooth and clashless changes of the operative gearing may be effected.

Another object of this invention resides in providing an improved method of mounting such a transmission, as a unit, upon an insulated base with which is also assembled driving means comprising an electric motor, together with the provision of improved means for mounting and insulating the motor, transmission housing and base.

Other objects and advantages will be apparent from the following description, wherein reference is made to the accompanying drawings illustrating a preferred embodiment of my invention, and wherein similar reference numerals designate similar parts throughout the several views.

In the drawings:

Figure 7 is a vertical sectional view taken substantially on the line 7—7 of Figure 4 and looking in the direction of the arrows;

Figure 8 is a vertical sectional view taken substantially on the line 8—8 of Figure 4 and looking in the direction of the arrows;

Figure 9 is a perspective view of the drum cam member, and

Figure 10 is a diagrammatic view showing in plane projection the development of the two cam tracks of the drum cam unit.

Figures 1, 3:
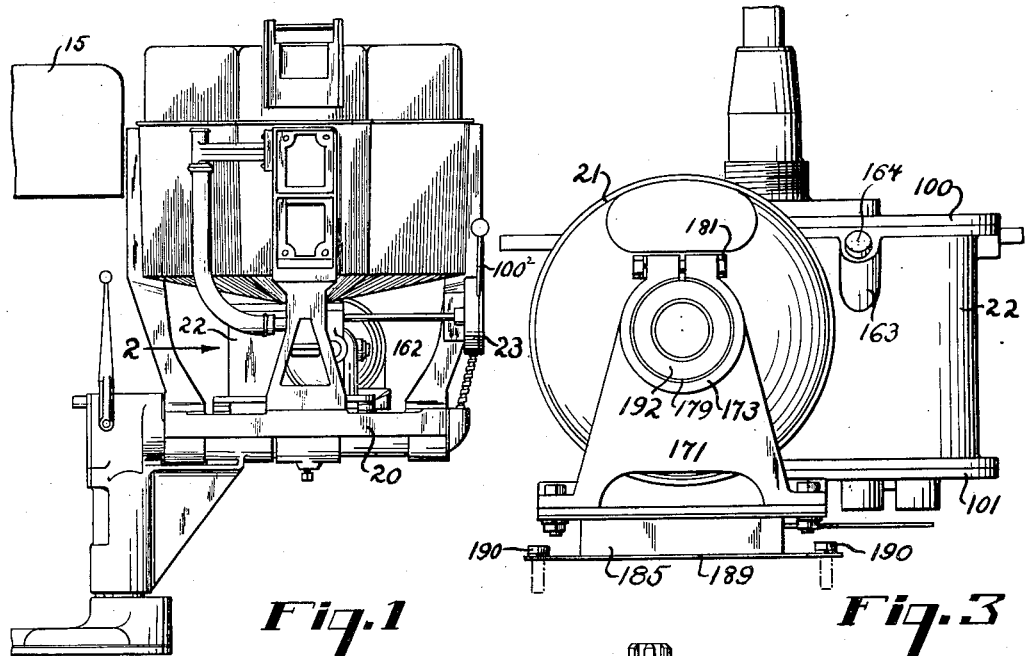
Figure 1 is a side elevational view of a dishwashing and convertible household machine of the type disclosed in my copending application, Serial Number 594,679, filed February 23, 1932, showing the same in upright position and ready for use, standing in front of a sink beneath which it may be folded when not in use, in the manner described in said copending application.
Figure 3 is an end view thereof taken looking in the direction indicated by the arrow 3 of Figure 2.
Figure 2:
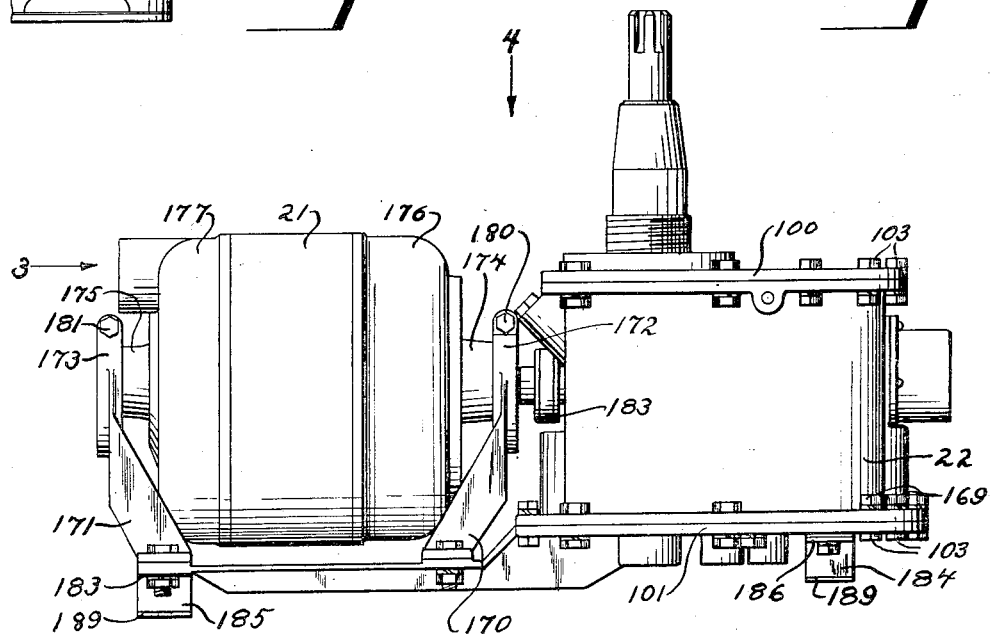
Figure 2 is a side elevational view of my improved transmission and motor unit, looking at the same in the direction indicated by the arrow 2 of Figure 1.
Figure 4:
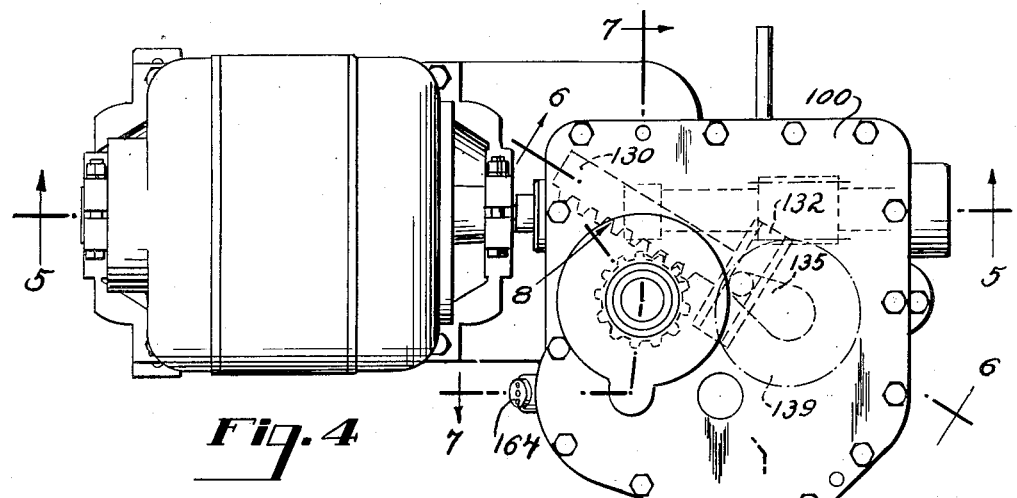
Figure 4 is a top plan view thereof.
Figure 5:
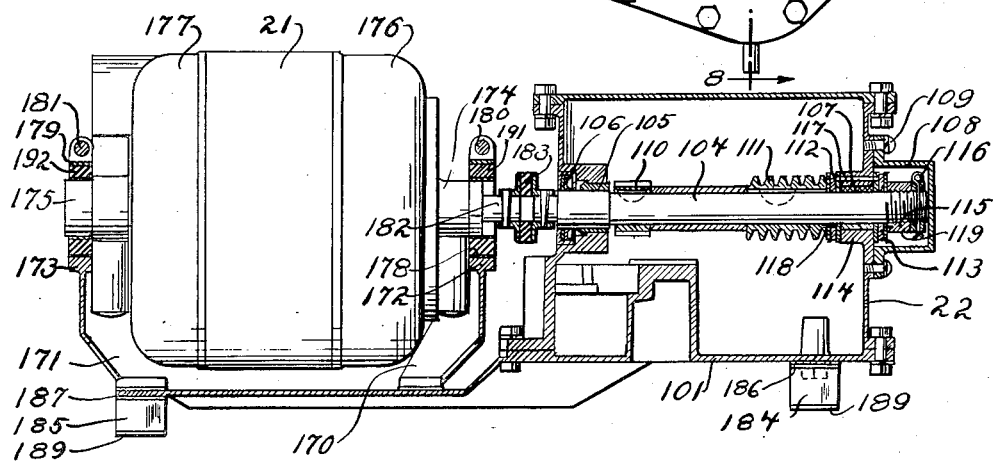
Figure 5 is a vertical sectional view taken substantially on the line 5—5 of Figure 4 and looking in the direction of the arrows, the motor being shown in elevation.
Figure 6:
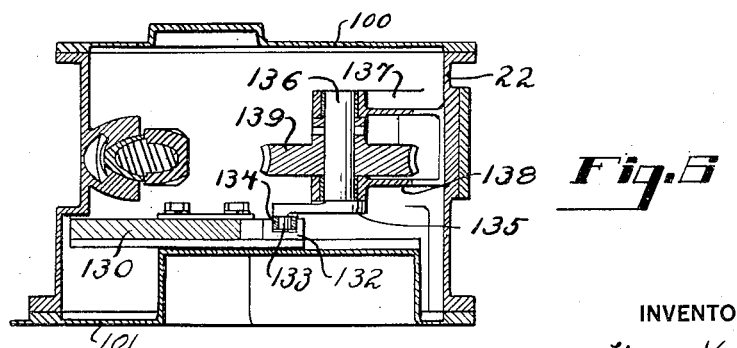
Figure 6 is a vertical sectional view taken substantially on the line 6—6 of Figure 4 and looking in the direction of the arrows.

Referring now to the drawings, reference character 22 designates the hollow box-like casing of my improved transmission, the open top and bottom of which are closed by cover plates 100, 101, respectively, which are of course oil-tight in their fit. They may be secured by nuts and bolts as 103. The transmission drive shaft 104 (Figure 5) is journaled in a bearing 105 in the wall of the transmission casing and extends therethrough, a stuffing box 106 being provided to guard against leakage of oil along the shaft. The driving shaft extends completely across the casing, its other end being journaled in the bearing 107, supported by the opposite wall thereof. The farther end of the shaft projects from the casing, as shown in Figure 5, its end being protected by a tight cap 108 secured thereover and to the casing by screws 109. The shaft 104 carries the driving gears 110—111, the former of which is a spiral gear, while the latter is a worm. These gears of course impose a certain amount of end thrust upon the shaft when the transmission is in operation, and to guard against wear which might be caused thereby, thrust bearings 112—113 are arranged upon the shaft, one upon each side of the boss 114, which carries the bearing 107. The inner bearing 112 fits between the gear 111 and the bearing boss 114, while the outer bearing 113 is positioned and thrust is imposed upon it by a castellated nut 115 retained upon the end of the shaft, by a cotter pin 116, thus also providing means for taking up end play. The bearings comprise discs of fiber or the like arranged between discs of metal. The inner discs of both bearing assemblies are prevented from rotating by a single pin 117 extending through the bearing boss and into the discs. The outer disc of bearing 112 is pinned to the worm 111, as shown at 118, while another pin, as 119, secures the outer disc of the bearing 113 to the nut 115 and thus insures its rotation with the shaft.

The spiral driving gear 110 meshes with the complementary spiral gear 120, which is loose upon the driven or machine shaft 62 but may be clutched thereto when desired in a manner which will presently be described. Rotating as a unit and here shown as formed integrally with the gear 120, is a pinion 121 in constant mesh with the gear 122 on countershaft 123. The countershaft is vertically journaled in bearings 124, 125, the former formed in the cover plate 100 of the transmission casing, while the latter is carried by the bracket 126 projecting inwardly from the casing wall, as shown in Figure 7. Carried by and adjacent the other end of the countershaft 123 is a pinion 127 meshing with gear 128, also loose upon the main shaft 62, but selectively clutchable thereto. The train comprising gears 110—120, 121—122, 127—128 will be seen to comprise reduction gearing, which when utilized to drive the main shaft, serves to rotate the same at reduced speed.

Also loose upon the driven shaft 62 is a pinion 129, which may also be clutched thereto when desired. Gear 129 is drivable through a rack 130, gibbed in a slideway 131 carried by an upstanding portion formed upon the lower casing plate 101. Integrally upon the end of the rack farthest from the pin is formed a Scotch yoke 132, in which engages a crank pin 133 and roller 134. The crank 135 is fast upon the lower end of a stub shaft 136, also vertically journaled within the housing and carried by a pair of hangers 137—138 projecting inwardly from the casing wall. The crank shaft 136 is drivable by a worm wheel 139 in constant mesh with the worm 111 on the driving shaft.

It will be apparent that if the gear unit 120—121 is clutched to the driven shaft 62 while gears 128 and 129 remain loose thereon, a direct and relatively high speed drive will be delivered to the driven shaft through the gears 110—120. If however, the gears 120—121, as well as the gear 129, are loose upon the driven shaft, while the gear 128 is secured thereto, a reduced speed drive will be imparted to the shaft 62 through the gears 110—120, 121—122, countershaft 123 and gears 127—128. If the gear unit 120—121 and the gear 128 are all loose upon the main shaft while the gear 129 is secured thereto, a rocking motion will be imparted to the driven shaft through the gears 111—139, stub shaft 136, crank 135, yoke and rack 132—130, and gear 129.

For accomplishing the desired clutching and unclutching of the gears 120—121, 128—129, I provide crown clutches 140, 141 slidably feathered upon splined portions 142, 143 of the driven shaft. As shown in Figures 7 and 8, the clutch member 140 is formed with opposed teeth 144—145, extending in each direction for cooperation with inwardly facing opposed toothed portions 146—147 carried by the gear 128 and the gear unit 120—121 respectively. Sufficient space is left between the clutch teeth 146, 147 carried by the gears so that when the clutch unit 140 is in the medial position both gears are left loose upon the shaft. For clutching the gear 129 to the shaft I form upon one face thereof a similarly projecting toothed portion 148 adapted to cooperate with the sliding clutch 141 carrying clutch teeth 149 which may be moved into engagement with the teeth 148 to secure the gear 129 to the shaft when desired; although only when the gear 128 and the gear unit 120—121 are loose upon the driven shaft.

The clutches 140—141 are slidable by means of forks 150—151 engaging the grooves 140'—141' formed in the clutch members, as shown in Figures 7 and 8. The shifting forks are slidable upon a rod 152 extending vertically through the housing between the upper and lower cover plates, in which apertured bosses 153—154 are formed to support the rod ends. The forks are shiftable by means of cylinder cams 155—156 formed as a unit and journaled upon the rod 157 fixed in and extending upwardly from the lower closure plate 101, as shown in Figure 8. In the cam tracks engage followers 158—159 carried by the shifter forks. Upon the upper end of the drum cam unit may be formed a miter gear 160, shown as integral therewith, by means of which the cams 155—156 may be turned through the agency of the meshing miter gear 161 fast upon the shaft 162, which extends to the gear controlling mechanism.

The general contouring and detailed development of the cam tracks appear clearly in Figures 9 and 10, a study of which will show that the cam tracks are arranged to move the forks and so the clutches to a neutral position between each driving position. The shifting lever $100^2$ is arranged to turn the shaft 162 and so the cam unit, through approximately two hundred forty degrees by a relatively short lever movement, which may be accomplished by suitable gearing (not shown) contained in the housing 23. As the lever is moved from a substantially vertical toward a horizontal position it so rotates the cams as to first engage the clutch 141 with the gear 129, while the clutch 140 is held in neutral, thus connecting the transmission mechanism for oscillation of the driven shaft when the motor is running. Continued movement of the lever in the same direction frees the clutch 141, thus providing a neutral position. Continued downward movement of the lever maintains the clutch 141 in freed relation and moves the clutch 140 first to a neutral and then to the uppermost position, in which it secures the gear to the shaft 128 to provide the low speed drive. The fork 150 next moves the clutch 140 downwardly and engages the gear unit 120—121 with the driven shaft to provide the direct or high speed drive.

A breather port 163 may be provided in the wall of the casing, closed by a vent cap 164 adapted to prevent oil splashing. A filling and drain plug 165 may also be provided in the casing wall. The main drive shaft extends upwardly through the cover plate 100 and an upwardly projecting elongated boss 97 in which are provided suitable bearings, as 166—167, and a stuffing box 168.

The transmission casing is bolted to the supporting platform, as by the bolts 169, to which platform are also bolted the upstanding motor supports 170—171 which terminate at their upper extremities in annular portions 172—173 adapted to spacedly encircle the bosses 174—175 formed integrally with the end bells 176—177 of the electric motor 21. Annular rubber cushions 191—192 are bonded to the bosses 174—175 and to the outer rings 178—179 which may be clamped in the annular portions 172—173, the latter being split and provided with apertured ears through which clamping bolts 180—181 may extend. The motor shaft 182 is coupled to the driving shaft 104 of the transmission by a resilient coupling member 183. The motor will thus be seen to be entirely mounted upon rubber in such manner that no direct metallic connection is provided between it and its support or the transmission unit. The motor is free to rock about its axis of support under reverse torque as in starting, load variations, etc. The entire motor and transmission unit is also preferably mounted upon rubber blocks 184—185, these blocks being bonded to plates 186—187 to which the unitary supporting member 188 and lower transmission cover plate 101 are bolted. The rubber blocks 184—185 are also bonded to plates 189 which may be directly bolted to the sub-base 20 of the machine, as by bolts 190.

I preferably utilize an electric motor in which there is inbuilt an automatic magnetic or centrifugal clutch (not shown) which operates to maintain the motor armature and driving shaft disconnected until the motor attains a predetermined speed, at which it may deliver a substantial percentage of its full driving torque, and to disconnect these members in event of a sudden or unduly heavy load, thus preventing injury to either the motor or the transmission mechanism.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a power transmission mechanism, a drive shaft, a plurality of driving gears thereon, a driven shaft, reduction gearing connecting one of the driving gears to the driven shaft, and independent means connecting another driving gear to the driven shaft to enable oscillation of the latter upon rotation of the drive shaft, comprising a crank rotatable by said second driving gear, a pinion on the driven shaft and a rack meshing therewith, a Scotch yoke connecting the crank and rack, and means for selectively rendering either of the driving means operable or inoperable at will, including a clutch member slidably mounted on the driven shaft, a pair of spaced shafts generally parallel to the driven shaft, a shifting member slidably carried by one for moving the clutch, and a cam carried by the other for moving the shifting member.

2. In a power transmission mechanism, a drive shaft, a plurality of driving gears thereon, a driven shaft, a plurality of driven gears normally loose thereon, one driving and one driven gear being in mesh, additional gearing indirectly connecting another of the driving gears to another of the loose gears, means so connecting another driving gear to another of the loose gears as to enable oscillation of the latter upon rotation of the drive shaft, a pair clutch members movable to selectively secure and release the loose gears with respect to the driven shaft, a pair of spaced shafts generally parallel to the driven shaft, shifting arms slidably carried by one of said shafts, unitary cam means carried by the other for moving the shifting arms, and a pivoted lever for controlling the cam means by simple swinging movement of the lever, thereby to enable selective oscillation or rotative driving of the driven shaft at variant speeds.

3. In combination with a household machine having a tub, a combined driving and transmission unit comprising a base, an electric motor having a substantially axial shaft, resilient supporting means for the motor carried by the base and substantially concentric with the shaft, thereby permitting the motor to rock about the axis of the motor shaft, a transmission drivable by the motor and having a connecting portion extending into the tub, a transmission casing carried by the base, a transmission driving shaft extending from the casing, and means resiliently coupling the motor shaft to the transmission shaft and also substantially concentric with said shaft, the motor being otherwise unconnected to the base and transmission and transmission casing, whereby said resilient members effectively prevent transmission of noise or vibration from the motor to the tub through either the transmission, transmission housing or base.

GEORGE K. PARSONS.